Patented Sept. 12, 1933

1,926,063

UNITED STATES PATENT OFFICE 1,926,063

TREATMENT OF COTTON, SILK, OR ARTIFICIAL SILK, OR GOODS MADE THEREFROM

Edmund Charles Rossiter and William Charles Davis, London, England, assignors, by mesne assignments, to Synthetic Plastics Company Inc., New York, N. Y., a corporation of Delaware No Drawing. Application June 10, 1926, Serial No. 115,107, and in Great Britain June 19, 1925

8 Claims. (Cl. 91—70)

This invention relates to the treatment of cotton, silk, or artificial silk or goods made therefrom, in order to give the same a distinctive character, usually styled in the textile industries a "finish". The "finish" given by our treatment has not been previously produced and the properties it possesses have not heretofore been known.

These results are obtained in our process by the condensation of formaldehyde with thiourea or the like. The first condensation of the substances results in a product that is soluble in water at normal temperatures. This soluble condensation product is readily converted in the presence of acids, and, by the application of heat, into a final synthetic resin which is insoluble in water.

In carrying out our invention we take the condensation product which is soluble in water and mix with it an acid substance along with one or other or a mixture of the usual "fillers" (such as starch or other farinaceous material, china clay, gums, etc., which are well known in the textile industries as "fillers") for filling the cotton, silk, artificial silk or goods made therefrom.

The mixture of substances thus prepared is placed in a vat, tank or the like, and the material to be treated is passed or "padded" through said mixture. As it emerges it is dried by heat and is further heated, by which actions the final synthetic resin which is not soluble in water is produced on and in the material treated and thereby fixes the filler so that said filler cannot be removed by washing.

This forms the essential feature of our invention because when materials are "filled" in any of the usual known processes, the filling is readily removed by washing, whereas by following our method and using our substances, the "filling" is fixed to the material by a resin which is rendered insoluble at that period or part of the treatment where it is most effective.

As condensing agents most acids, whether mineral or organic, may be employed, or acid salts thereof, or the hydrochlorides of organic bases. We, however, prefer to employ an organic acid such as oxalic acid or a salt thereof such as potassium tetroxalate.

In one method of carrying out the invention, cotton or cotton goods are passed through a mixture of a filler, and a condensation product in solution made as above described from thiourea and formaldehyde and acid, at room temperature. The goods are then passed through a wringer, and afterwards through hot rolls or other device to convert the condensation product into the insoluble state. The temperature of the goods should not exceed 120° to 140° C.

The bath may be prepared by mixing together an aqueous solution containing not more than 8% of the condensation product and an aqueous solution of starch at room temperature, and finally adding, just before immersion of the goods, a solution of potassium tetroxalate.

What we claim is:—

1. A process for providing cotton, silk, artificial silk and goods made therefrom, with a filler, which comprises impregnating the material with an aqueous solution or suspension of a customary filling material containing in addition an initial condensation product of formaldehye and a carbamid, and subsequently converting the initial condensation product into a substantially water insoluble state.

2. A process for providing cotton, silk, artificial silk and goods made therefrom, with a filter, which comprises impregnating the material with an aqueous solution or suspension of a customary filling material containing in addition an initial condensation product of formaldehyde and thiourea, and subsequently converting the initial condensation product into a substantially water insoluble state.

3. A process for providing cotton, silk, artificial silk and goods made therefrom, with a filler which comprises impregnating the material with an aqueous solution or suspension of a customary filling material containing in addition about 8% of an initial condensation product of formaldehyde and thiourea, and subsequently converting the initial condensation product into a substantially water insoluble state.

4. Sized cotton, silk, artificial silk and goods made therefrom, the sizing comprising a customary filling material and a water insoluble formaldehyde-carbamid condensation product.

5. Sized cotton, silk, artificial silk and goods made therefrom, the sizing comprising the customary filling material and a water insoluble formaldehyde-thiourea condensation product.

6. A process for providing cotton, silk, artificial silk and goods made therefrom, with a filler, which comprises impregnating the material with an aqueous solution or suspension of a customary filling material containing in addition a condensing agent of an acid nature and an initial condensation product of formaldehyde and thiourea, and subsequently converting the initial condensation product into a substantially water insoluble state by hot rolling the impregnated material.

7. A process for providing cotton, silk, artificial silk and goods made therefrom, with a filler, which comprises impregnating the material with an aqueous solution or suspension of a customary filling material containing in addition a condensing agent of an acid nature and about 8% of an initial condensation product of formaldehyde and thiourea, and subsequently converting the initial condensation product into a substantially water insoluble state with the aid of heat.

8. A process for providing cotton, silk, artificial silk and goods made therefrom, with a filler, which comprises impregnating the material with an aqueous solution or suspension of a customary filling material containing in addition a condensing agent of an acid nature and an initial condensation product of formaldehyde and thiourea, and subsequently converting the initial condensation product into a substantially water insoluble state with the aid of heat.

EDMUND CHARLES ROSSITER.
WILLIAM CHARLES DAVIS.